US008973927B2

(12) United States Patent
Belanger

(10) Patent No.: US 8,973,927 B2
(45) Date of Patent: Mar. 10, 2015

(54) AUXILIARY ROLLING SYSTEM AND WASTE BIN INCLUDING SAME

(71) Applicant: Guy Belanger, Quebec (CA)

(72) Inventor: Guy Belanger, Quebec (CA)

( * ) Notice: Subject to any disclaimer, the term of this patent is extended or adjusted under 35 U.S.C. 154(b) by 109 days.

(21) Appl. No.: 13/721,394

(22) Filed: Dec. 20, 2012

(65) Prior Publication Data

US 2013/0313798 A1    Nov. 28, 2013

Related U.S. Application Data

(60) Provisional application No. 61/578,311, filed on Dec. 21, 2011.

(51) Int. Cl.
| | |
|---|---|
| B62B 1/14 | (2006.01) |
| B62B 1/18 | (2006.01) |
| B62B 3/06 | (2006.01) |
| B62B 3/10 | (2006.01) |
| B62B 1/26 | (2006.01) |

(52) U.S. Cl.
CPC ............... B62B 1/18 (2013.01); B62B 3/0643 (2013.01); B62B 3/104 (2013.01); B62B 1/264 (2013.01); B62B 1/14 (2013.01); B62B 2202/20 (2013.01)
USPC ... 280/47.2; 280/79.5; 280/47.17; 280/47.26; 414/444

(58) Field of Classification Search
CPC ...... B62B 2202/20; B62B 1/14; B62B 1/264; B62B 3/0625; B62B 3/0643; B62B 3/104; B62B 5/0083; B62B 5/0089; B62F 1/1468; B62F 1/1473

USPC ............ 280/79.5, 47.131, 47.16, 47.17, 47.2, 280/47.26; 414/444, 434, 436
See application file for complete search history.

(56) References Cited

U.S. PATENT DOCUMENTS

| | | | | |
|---|---|---|---|---|
| 722,569 | A | * | 3/1903 | Dilger ........................... 280/47.3 |
| 2,345,381 | A | * | 3/1944 | Chenette .................... 280/47.35 |
| 2,521,819 | A | * | 9/1950 | Baer ................................ 280/35 |
| 3,008,595 | A | * | 11/1961 | Van Lokeran et al. ......... 414/456 |
| 3,157,411 | A | * | 11/1964 | Rhodes ....................... 280/47.29 |
| 3,208,614 | A | * | 9/1965 | Armitage et al. ............. 414/447 |
| 3,257,018 | A | * | 6/1966 | Miles ............................. 414/444 |
| 4,135,725 | A | * | 1/1979 | DiRoma .................... 280/47.26 |
| 4,417,738 | A | * | 11/1983 | Kendall ..................... 280/43.17 |
| 4,420,168 | A |   | 12/1983 | Dewing |
| 4,807,916 | A | * | 2/1989 | Erickson ......................... 294/15 |
| 5,000,467 | A | * | 3/1991 | Becca ........................ 280/47.24 |
| 5,246,239 | A | * | 9/1993 | Braden ...................... 280/47.24 |

(Continued)

FOREIGN PATENT DOCUMENTS

| | | |
|---|---|---|
| DE | 102010052211 | 5/2011 |
| DE | 102010052211 A1 * | 5/2011 |

(Continued)

*Primary Examiner* — Hau Phan
*Assistant Examiner* — Steve Clemmons

(57) ABSTRACT

An auxiliary rolling system for a rolling bin having a container and a set of bin wheels mounted thereon. The auxiliary rolling system comprises a frame securable to the container of the rolling bin, at least one rotatable auxiliary wheel, and a handle for controlling the auxiliary rolling system. When mounted on the rolling bin, the at least one auxiliary wheel is positioned opposite to the set of bin wheels such that the auxiliary rolling system is movable between a stationary configuration, where movement of the bin is prevented, and a transport configuration where movement of the bin is allowed.

23 Claims, 12 Drawing Sheets

(56) References Cited

U.S. PATENT DOCUMENTS

| | | | |
|---|---|---|---|
| 5,427,393 A * | 6/1995 | Kriebel | 280/47.28 |
| 5,582,114 A * | 12/1996 | Feiner | 108/50.11 |
| 5,940,932 A * | 8/1999 | LaHay | 16/30 |
| 6,386,560 B2 * | 5/2002 | Calender | 280/47.34 |
| 6,491,311 B1 * | 12/2002 | Underwood et al. | 280/43.12 |
| 7,575,246 B1 * | 8/2009 | Lunski | 280/651 |
| 7,686,110 B1 * | 3/2010 | Agarwal | 180/13 |
| 8,485,773 B2 * | 7/2013 | Coats | 414/453 |
| 8,695,736 B1 * | 4/2014 | Samaroo | 180/11 |
| 2003/0194303 A1 * | 10/2003 | Lunger | 414/444 |
| 2008/0101899 A1 * | 5/2008 | Slonecker | 414/462 |
| 2011/0000054 A1 * | 1/2011 | Trifari, Jr. | 24/457 |
| 2011/0049823 A1 * | 3/2011 | Coats | 280/47.3 |

FOREIGN PATENT DOCUMENTS

| | | | | |
|---|---|---|---|---|
| EP | 1470984 A1 * | 10/2004 | | B62B 1/26 |
| EP | 2325109 | 5/2011 | | |
| GB | 2450150 A * | 12/2008 | | B62B 1/14 |
| GB | 2461627 | 1/2010 | | |
| GB | 2461627 A * | 1/2010 | | B65F 1/14 |
| WO | 2007059794 | 5/2007 | | |
| WO | 2012083351 | 6/2012 | | |

* cited by examiner

AUXILIARY ROLLING SYSTEM AND WASTE BIN INCLUDING SAME

CROSS-REFERENCE TO RELATED APPLICATIONS

This application claims priority under 35 USC §119(e) of U.S. provisional patent application 61/578,311 filed on Dec. 21, 2011, the specification of which is hereby incorporated by reference.

FIELD OF THE INVENTION

The present invention relates to an auxiliary rolling system for waste bins. More particularly, the present invention relates to an auxiliary rolling system, an auxiliary rolling kit, and bins comprising the same.

BACKGROUND OF THE INVENTION

Rolling waste bins, also generally referred as "Rollout containers" or "Wheelie bins", are large containers designed to be easily transported from a storage point to a pick-up point. Rolling bins allow users to temporarily store waste in a convenient storage point, preferably close to a house or another facility where the waste may need to be disposed of, and subsequently be easily moved by a user to a pick-up point where the content of the bins may be emptied into a garbage or recycling truck by a collector.

In the course of the present application, waste should be understood as any discarded product temporarily stored in a bin, such as, without being limitative, garbage, recycling, compost, or the like.

Conventional rolling waste bins comprise a vertically extending container having a lid for covering the top portion. The lid is pivotally attached to the container, in order to allow the container to be easily opened and closed. Rolling capabilities are typically provided by a set of non-swiveling bin wheels, located at the bottom of the container, on opposite sides, such that in the stationary position the bin is supported by the bottom wall, thereby being frictionally held immobile. For transport, the bin is pivoted such that the bottom wall is lifted off the ground and the container is supported only by the rotating wheels. Handles are normally provided at the top of the container to assist in the pivoting and transport of the bin.

One of the major drawbacks of a rolling bin such as those described above is that once loaded with waste or recycling, the bin becomes heavy and can be difficult to pivot, from the stationary position to the transport position, especially for children or elderly people.

Moreover, since the pivot of the lid is generally located on the same side of the container as the wheels, and consequently on the same side of the container as the handles, it is common for users to store the bin with the handles proximal to a wall or another obstacle. This storage position allows easy access to the container, as the opening side of the lid faces away from the obstacle. However, this position renders the subsequent transport of the loaded bin difficult, as the handles cannot be easily reached to pivot the bin. Thus the user generally needs to rotate or displace the loaded bin while the bottom wall still abuts the ground, to access the handles, in order to be able to pivot the bin. Once again, given the friction between the ground and the bottom wall of the bin, such handling of the bin may require a physical effort exceeding the capabilities of certain people.

In light of the above, there is presently a need for an auxiliary rolling system and auxiliary rolling kit for bins which, by virtue of its design and components, would be able to overcome or at least minimize some of the above-discussed prior art problems.

SUMMARY OF THE INVENTION

According to an aspect of the invention, there is provided an auxiliary rolling system for a rolling bin having a container and a set of bin wheels mounted thereon. The auxiliary rolling system comprises a frame securable to the container of the rolling bin, at least one auxiliary wheel rotatably connected to the frame, and a handle operatively connectable to the frame for controlling the auxiliary rolling system. When mounted on the rolling bin, the at least one auxiliary wheel is positioned opposite to the set of bin wheels such that the auxiliary rolling system is movable between a stationary configuration, where movement of the bin is substantially prevented, and a transport configuration where movement of the bin is allowed.

According to another aspect of the present invention, there is provided an auxiliary rolling kit for assembling an auxiliary rolling system mountable on a rolling bin. The supplemental rolling kit comprises a frame, at least one auxiliary wheel rotatably connectable to the frame, and a handle pivotally connectable to the frame. The auxiliary rolling system resulting from the assembly of the auxiliary rolling kit is securable on the container to allow shifting of the bin between a stationary configuration, where the bin remains stationary, and a movable configuration, where the bin can be transported.

According to another aspect of the present invention, there is provided a rolling bin with an auxiliary rolling system. The rolling bin comprises a container, a set of bin wheels mounted on opposite sides of the container, and an auxiliary rolling system movable between a first position where the bin is stationary and a second position where the bin is movable. The auxiliary rolling system comprises a frame mounted on the container, at least one auxiliary wheel rotatably connected to frame and allowing the rolling bin to be supported by the combination of the set of bin wheels and the at least one auxiliary wheel, in at least the second position, and a handle rotatably connectable to the frame, rotation of the handle allowing a transition from the first position to the second position.

In an embodiment, in the stationary configuration, the auxiliary rolling system is configured for the bin to be supported by the bottom wall of the container abutting the ground, thereby resulting in frictional immobility. In the transport configuration, the auxiliary rolling system is configured for the bin to be supported by the set of bin wheels and the at least one auxiliary wheel, with the bottom wall being spaced-apart from the ground.

In an embodiment, the at least one auxiliary wheel is pivotally mounted to the bin. Furthermore, the at least one auxiliary wheel can be operatively connected to the handle such that the at least one auxiliary wheel pivots when the handle is pivoted to ease steering of the bin.

In an embodiment, the transition from the stationary configuration to the transport configuration is performed by pivoting the handle downwardly, the pivoting of the handle resulting in the support point of the bin shifting from the bottom wall of the container to the combination of the set of bin wheels and the at least one auxiliary wheel.

In an embodiment, the auxiliary rolling system is further provided with a wheel locking system. In this embodiment the auxiliary rolling system is configured for the bin to be supported by the set of bin wheels and the at least one auxiliary wheel in both the stationary configuration and the transport configuration. In the stationary configuration, the wheel locking system is configured to operatively lock the at least one auxiliary wheel and prevent displacement of the bin. In the transport configuration, the wheel locking system is configured to operatively unlock the at least one auxiliary wheel and allow displacement of the bin.

In an embodiment, the handle is removably attachable to the frame and allows a user to use the same handle in connection with a plurality of rolling bins provided with the present auxiliary rolling system.

According to still another aspect of the present invention, there is provided an auxiliary rolling system for a rolling bin having a container and a set of bin wheels mounted thereon. The auxiliary rolling system comprises: a frame securable to the container of the rolling bin and including a handle for controlling the auxiliary rolling system and at least one auxiliary wheel; wherein, when mounted on the rolling bin, the at least one auxiliary wheel is positioned opposite to the set of bin wheels such that the auxiliary rolling system is movable between a stationary configuration, where movement of the bin is prevented, and a transport configuration where movement of the bin is allowed.

According to a further aspect of the present invention, there is provided an auxiliary rolling kit for assembling an auxiliary rolling system mountable on a rolling bin, the auxiliary rolling kit comprising: a frame engageable with a container of the rolling bin, a pivotally connectable handle, and at least one rotatably connectable auxiliary wheel, wherein the auxiliary rolling system resulting from the assembly of the auxiliary rolling kit allows shifting of the bin between a stationary configuration and a transport configuration.

According to a further aspect of the present invention, there is provided a combination including a rolling bin and an auxiliary rolling system. The rolling bin comprises: a container and a set of bin wheels mounted on opposite sides of the container. The auxiliary rolling system comprises a frame secured to the container and including at least one auxiliary wheel and a pivotable handle; the auxiliary rolling system being movable between a stationary configuration and a transport configuration where the bin is movable.

The objects, advantages and features of the present invention will become more apparent upon reading of the following non-restrictive description of preferred embodiments thereof, given for the purpose of exemplification only, with reference to the accompanying drawings.

DETAILED DESCRIPTION OF PREFERRED EMBODIMENTS

It will be noted that in the following description, the same numerical references refer to similar elements. The embodiments, geometrical configurations, materials mentioned and/or dimensions shown in the figures or described in the present description are preferred embodiments only, given solely for exemplification purposes. Moreover, it will be appreciated that positional descriptions such as "upward", "downward", "forward", "backward", "above", "below", "left", "right" and the like should, unless otherwise indicated, be taken in the context of the figures and should not be considered limiting.

Figure 1:
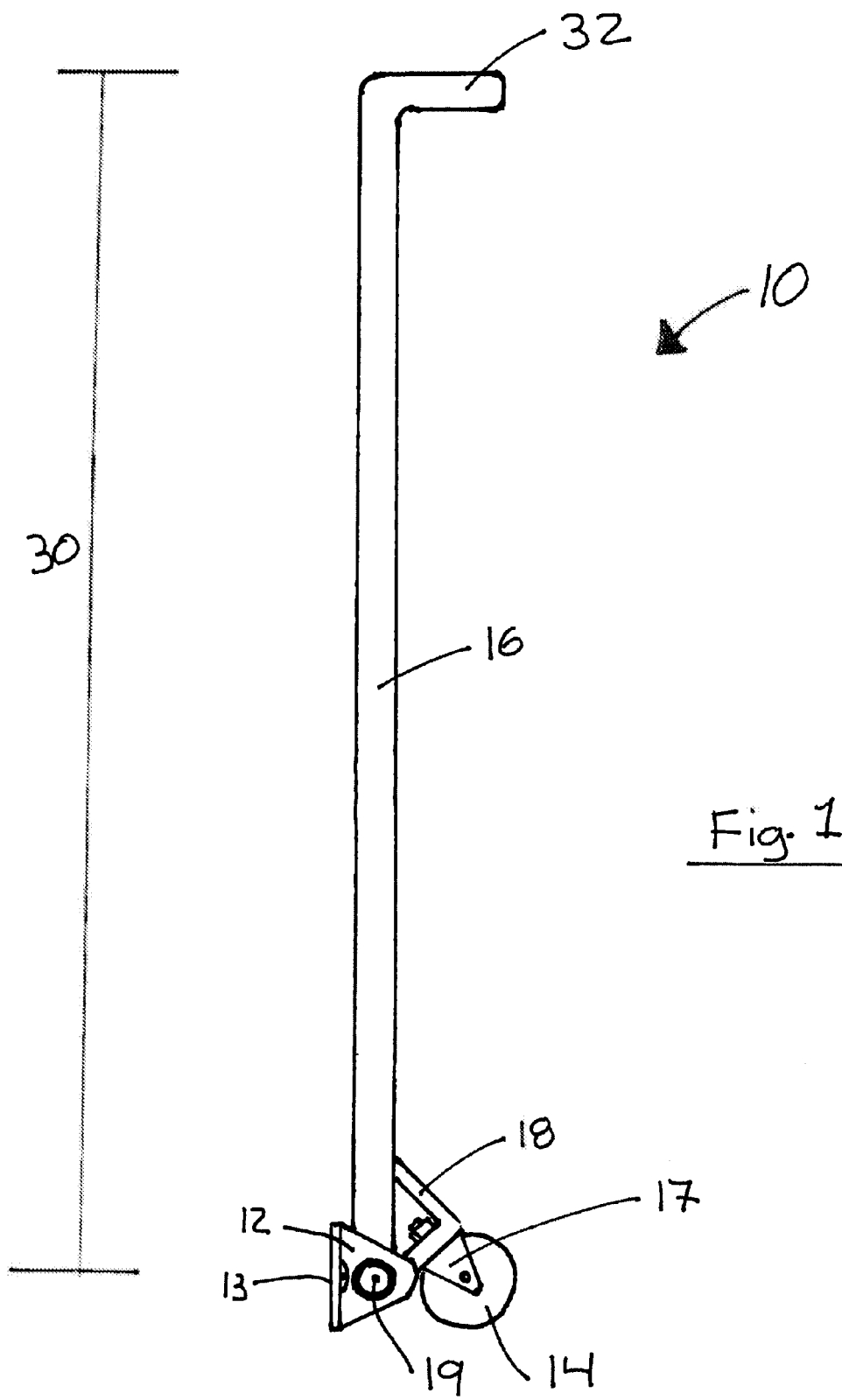
FIG. 1 is a side view of an auxiliary rolling system, according to an embodiment wherein the auxiliary wheel is a standard wheel, the auxiliary rolling system being shown in a stationary configuration.
Figure 2:
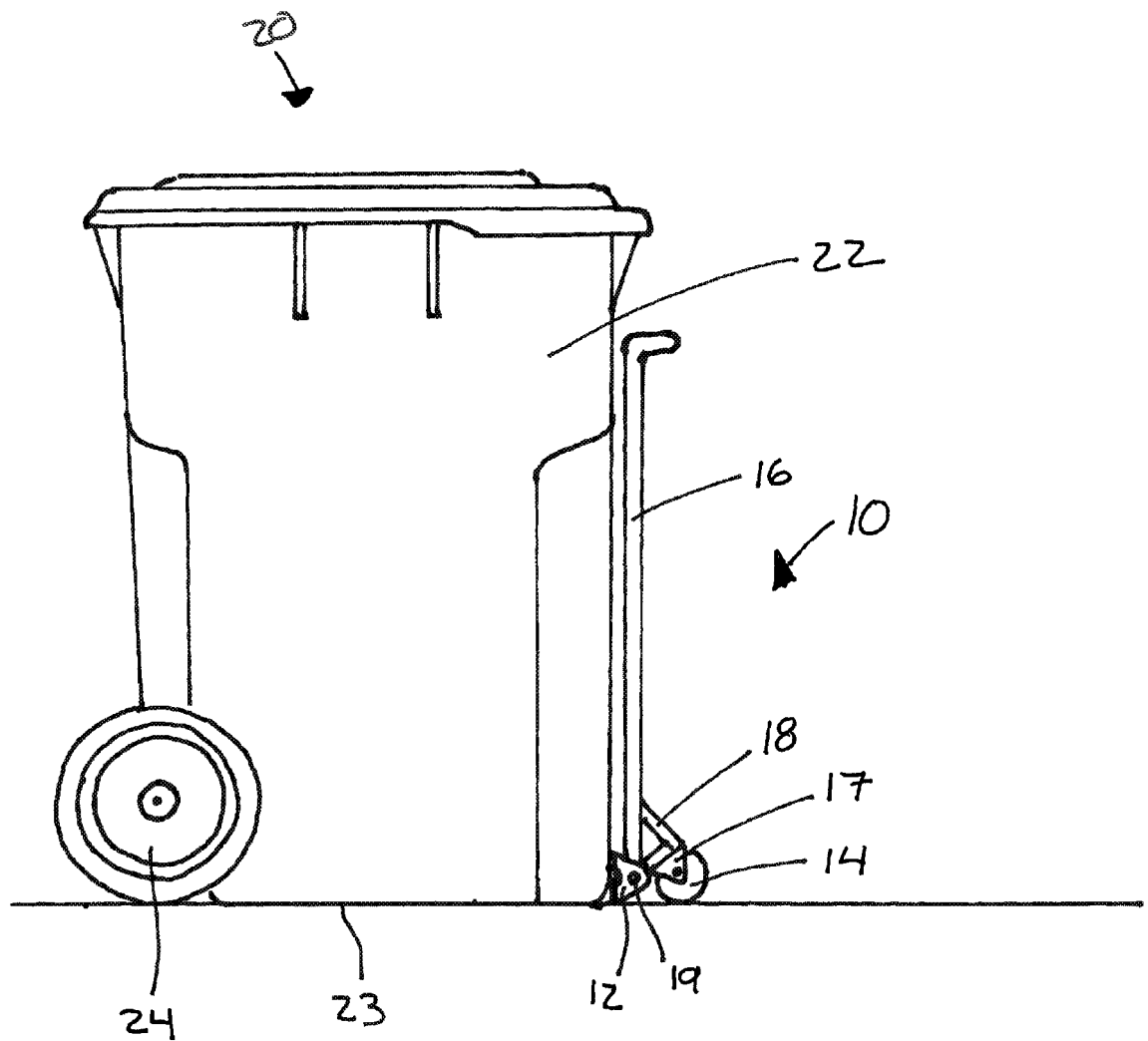
FIG. 2 is a side view of the auxiliary rolling system of FIG. 1, wherein the auxiliary rolling system is mounted on a rolling bin.

Referring now to the drawings and, more particularly, referring to FIGS. 1 and 2, there is shown an embodiment of an auxiliary rolling system 10 including a frame 12 securable to the container 22 of a bin 20, such as, without being limitative, a garbage or a recycling rolling bin similar to Brute Roll Out Containers commercialized by Rubbermaid™. In an embodiment, the bin 20 further comprises two bin wheels 24 rotatably mounted to the container 22. In an embodiment, the bin wheels 24 are spaced-apart from one another and mounted at a same side of the container 22. The bin wheels 24 are engaged with the ground in an operative (transport) configuration and an inoperative or stationary (storage) configuration. In the operative configuration, the container 22 is supported on the ground by the bin wheels 24. In the stationary configuration, at least a section of the container bottom wall 23 is in contact with the ground.

In the embodiment shown, the set of bin wheels 24 comprises two spaced-apart wheels. However, in alternative embodiments, the set of bin wheels 24 can comprise more or less wheels 24.

The frame 12 of the auxiliary rolling system 10 comprises a bin receiving member 13, at least one auxiliary wheel 14, and a handle 16. The at least one auxiliary wheel 14 is rotatably connected to a section of the frame 12 and the handle 16 is operatively mounted for controlling the auxiliary rolling system 10, as will be described in more details below. In an embodiment, the handle 16 is pivotally mounted to a section of the frame 12 and, more particularly, the bin receiving member 13.

One skilled in the art will easily understand that, in an embodiment, the auxiliary rolling system 10 is distinct from the rolling bin to which it is mounted to. Therefore, the auxiliary rolling system 10 could be mounted to bins of different sizes, brands, or models as long as the rolling bin has a rollable container.

In the embodiment shown, the bin receiving member 13 comprises a generally flat mounting surface which abuts the container 22, when the frame 12 of the auxiliary rolling system 10 is mounted thereon. One skilled in the art will however understand that the flat mounting surface of the bin receiving member 13 is optional and the shape and size of the bin receiving member 13 may differ from the flat design presented in the illustrated embodiment.

The frame 12 and, more particularly, the bin receiving member 13 can be secured on the container 22, generally at a lower section thereof, using several different mounting techniques or assembly. In an embodiment, the frame 12 can be permanently secured on the container 22 using permanent mounting means such as, without being limitative, rivets or other similar mounting means for securing the bin receiving member 13 to the container 22 permanently. In another possible embodiment, the frame 12 can be removably secured to the container 22 using removable mounting means or fasteners, such as, without being limitative, screws, bolts or similar mounting means allowing the bin receiving member 13 to be detachably mounted to the container 22.

To improve the stability of the frame 12 on the container 22, an additional inner plate (not shown) could be provided inside the container 22, the additional inner plate being provided at the inner surface of the container 22, horizontally and vertically in line with the bin receiving member 13. When an additional inner plate is used, the mounting means used to secure the frame 12 to the container 22 would spread through the bin receiving member 13 and the container 22, and into the additional inner plate. The addition of the inner plate would provide increased stability of the auxiliary rolling system 10, when mounted on the bin 20, by providing a thicker surface for the mounting means than the single thickness of the container 22. In an alternative embodiment, the additional inner plate could also be larger than the bin receiving member 13 to offer a larger inner contact surface and further increase the stability of the frame 12 on the container 22.

In another embodiment, the bin 20 could be manufactured with a supporting section (not shown) designed for the mounting of the frame 12 thereon. The supporting section could simply be a section of the container 22 having an increased rigidity. The increased rigidity could be the result of the section being thicker, being made of a more rigid material or any other design choices providing such a characteristic. In an embodiment, the bin receiving member 13 of the frame 12 could be secured to the supporting section using traditional mounting techniques such as those described above. In another embodiment, the design of the supporting section and the frame 12 could be such that the bin receiving member 13, or any other section of the frame 12, could be connected to the supporting section of the container 22 simply by sliding, clipping or press fitting the bin receiving member 13 thereon, or by any other similar mechanical mounting techniques, thereby resulting in fast and easy mounting/dismounting of the auxiliary rolling system 10 thereon. In an embodiment, the container 22 can include one of male member(s) and female member(s) and the frame 12 can include the other one of the male member(s) and female member(s) with the male and female members being complementary and engageable to secure the frame 12 and the container 22 together.

Referring to FIG. 1, a handle 16 is pivotally connected to the bin receiving member 13 of the frame 12. The handle has a length 30 which is sufficient to allow a user to steer the rolling bin 20, when in the transport configuration which will be detailed below. In an embodiment, the length of the handle 16 may be adjustable to fit users of different sizes. Adjustability of the length of the handle 16 can be embodied using known techniques such as, without being limitative, a telescopic handle lockable through locking pins or ball lock pins, for example.

For additional comfort, the gripping head 32 of the handle 16 may be covered with a grip cover, such as, without being limitative, a foam grip.

In an alternative embodiment, the handle 16 can be a removable (or disengageable) handle. The removable handle can be connected with the frame 12 by sliding and twisting, clipping, or press fitting the removable extremity onto the frame 12, fasteners or any other like techniques. For users owning several rolling bins (for example for trash, recycling and/or composting) a removable handle could be used in combination with different auxiliary rolling systems 10 mounted on the different bins 20.

Removable or adjustable handles would be advantageous in that they would help to overcome the problem of the handle 16 interfering with conventional automated system installed on garbage or recycling trucks, for mechanically emptying the bin into the container of the truck, by allowing the user to remove the handle or adjust its length when the bin is left for pick-up. When the handle 16 is a permanent handle that is not adjustable in height, the design of the handle must be such that it does not interfere with the above-mentioned automated system present on garbage or recycling trucks.

Referring to FIG. 2, when mounted on a rolling bin, the auxiliary rolling system 10 is positioned on the container 22 such that the at least one auxiliary wheel 14 is opposite to the set of bin wheels 24 of the container 22.

In the embodiment illustrated on FIG. 2, the auxiliary wheel system 10 comprises a single auxiliary wheel 14. However in alternative embodiments, the auxiliary wheel system 10 can comprise a plurality of auxiliary wheels 14, for instance and without being limitative, the auxiliary wheel system 10 can comprise two auxiliary wheels, spaced-apart or not from one another.

In the embodiment illustrated on FIG. 2, the auxiliary wheel 14 is a standard wheel which is part of a caster assembly, the wheel 14 being mounted on a fork 17. In the illustrated embodiment, the caster assembly is a swivel caster where the fork 17 is pivotally mounted to a section of the frame 12 defined as a wheel support 18, thereby allowing the wheel to roll in any direction. In an alternative embodiment the caster assembly could be a rigid caster, where the fork 17 is fixedly mounted to the wheel support 18. The caster assembly can be permanently or removably mounted to the wheel support 18 using conventional mounting techniques, such as, without being limitative, nuts and bolts, riveting, welding, soldering, gluing or the like.

In the embodiment shown, the wheel support 18 is secured to the handle 16 and pivots therewith, as will be described in more details below.

Figure 4:
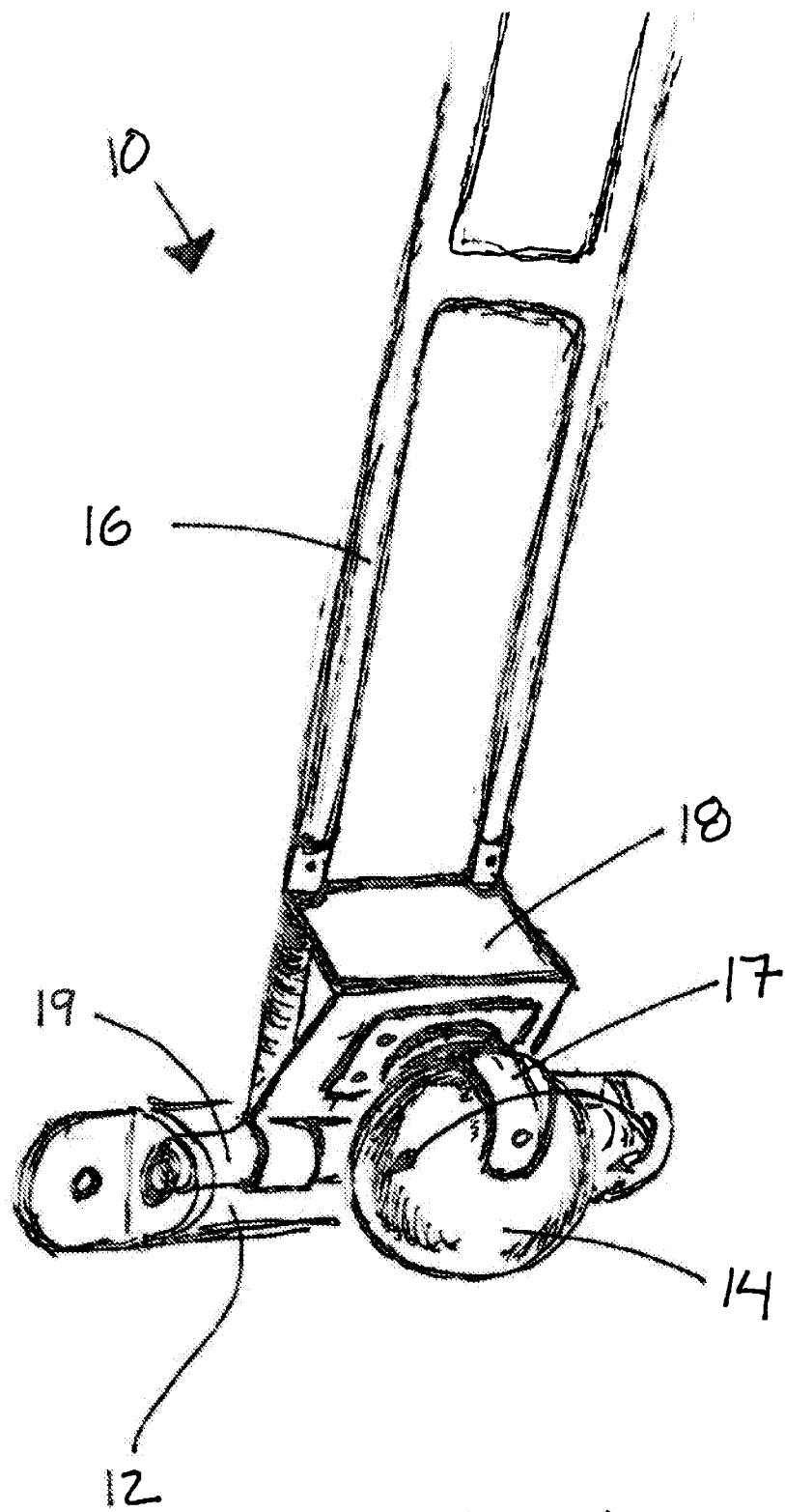
FIG. 4 is a perspective view of an auxiliary rolling system of FIG. 1, according to another embodiment wherein the auxiliary wheel is a spherical wheel.
Figure 5:
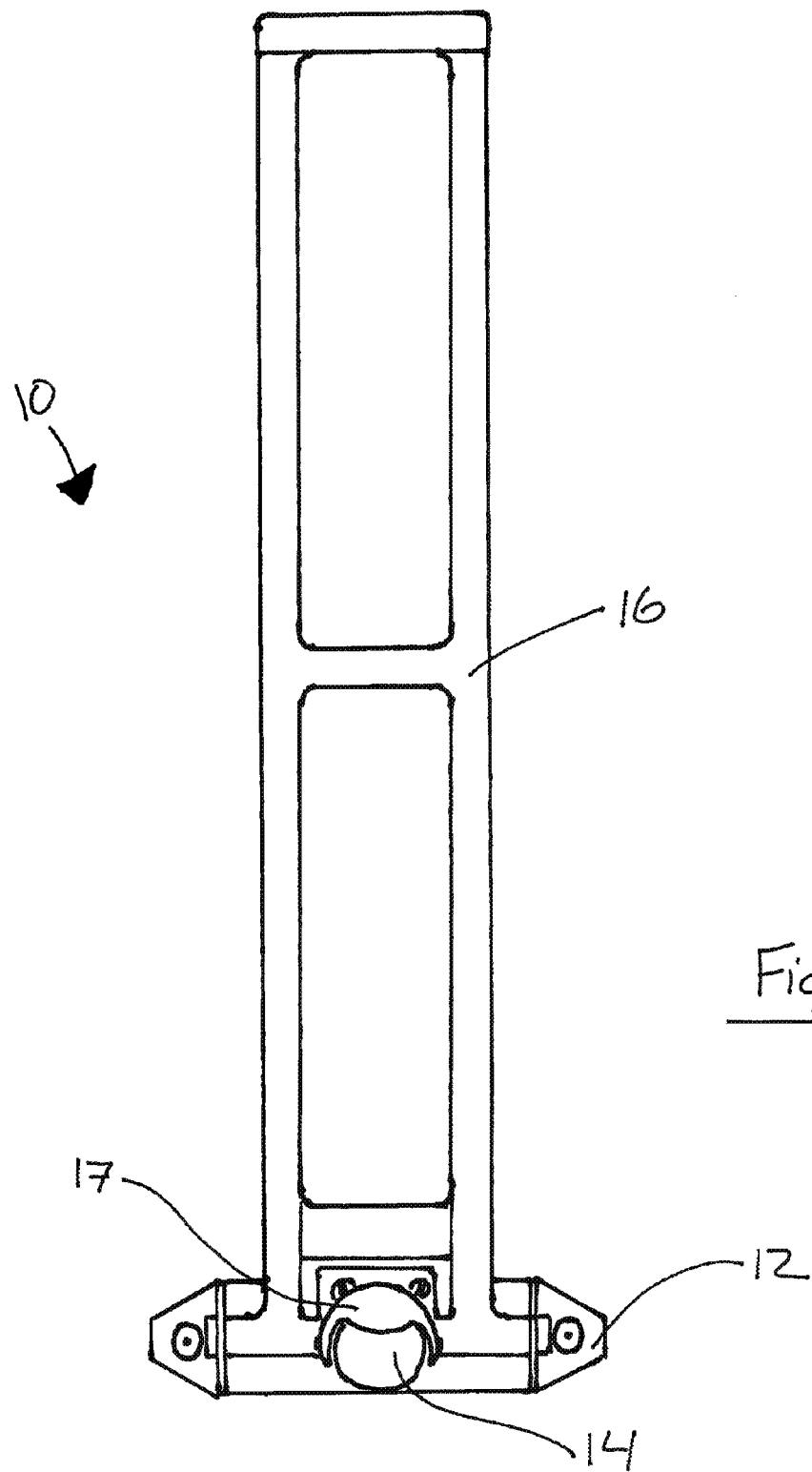
FIG. 5 is a front view of the auxiliary rolling system of FIG. 4.

In an alternative embodiment shown on FIGS. 4 and 5, the auxiliary wheel 14 could be a spherical wheel that is also part of a caster assembly, where a fork 17, mounted on the section of the frame 12 referred to as the wheel support 18, is provided. In this embodiment, the caster assembly is usually a swivel caster, allowing the wheel 14 to roll in any direction, but could be a rigid caster as well. One skilled in the art will understand that other types of wheels could also be used and that, once again, the caster assembly can be permanently or removably mounted to the wheel support 18 using conventional mounting techniques, such as, without being limitative, nuts and bolts, riveting, welding, soldering, gluing or the like.

It should be noted that even though, in the illustrated embodiments, the auxiliary wheel 14 is shown as part of a caster assembly, other types of wheel support could be provided for supporting the wheel 14 and operatively connecting it to the frame 12. Moreover, in an embodiment, the frame 12 could be free of wheel support 18, the wheel therefore being mounted directly on the handle 16 or any other component of the auxiliary rolling system 10.

Figure 3:
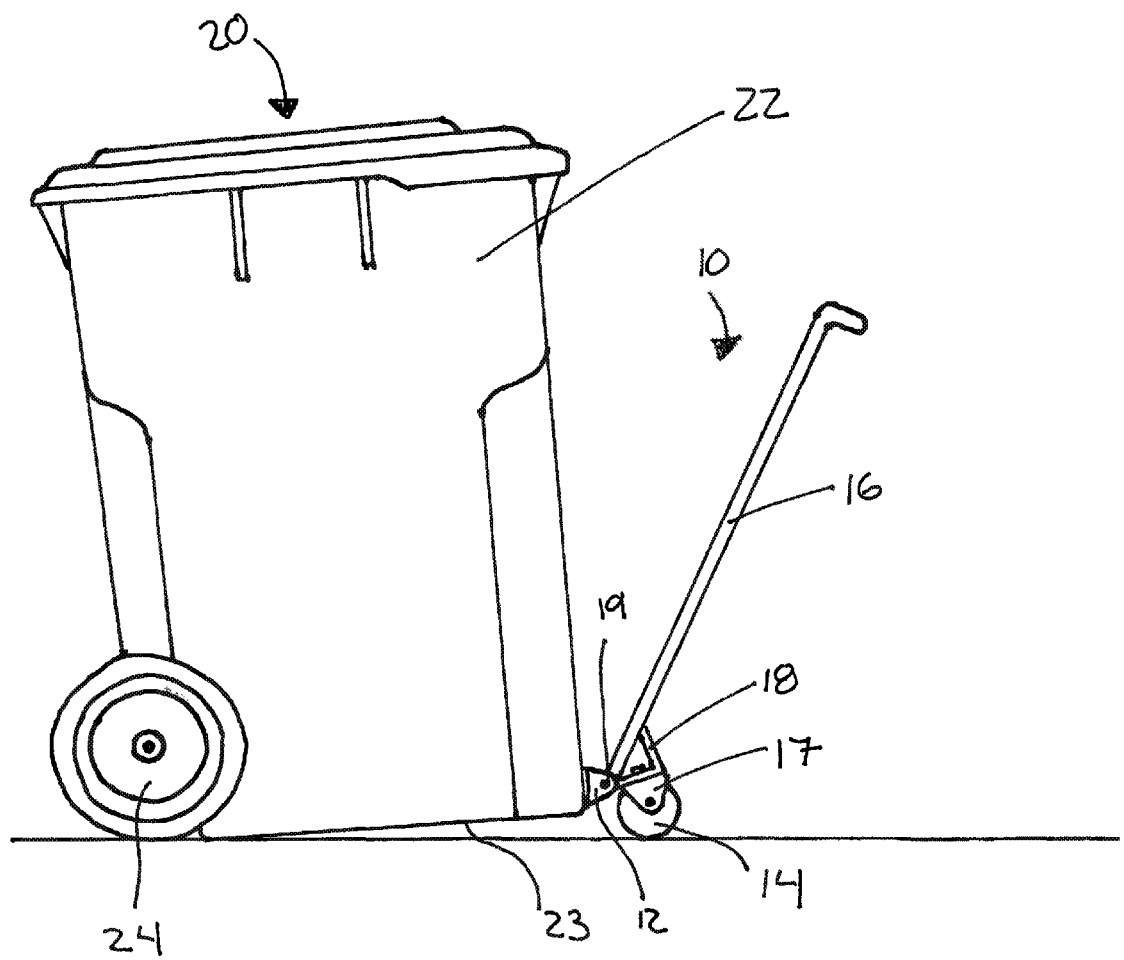
FIG. 3 is a side view of the auxiliary rolling system of FIG. 1, wherein the auxiliary rolling system is mounted on a rolling bin and is shown in a transport configuration.

Referring to FIGS. 1 to 3, in the embodiment shown, the handle 16 is pivotally connected to the bin receiving member 13 of the frame 12 by a pivoting assembly 19. In the illustrated embodiment, the pivoting assembly 19 allows the handle 16 to pivot vertically relative to the frame 12. In the illustrated embodiment, when a user pivots the handle 16, the wheel 14 also pivots, since the wheel support 18, onto which the wheel 14 is mounted, is driven by the rotation of the handle 16, given that one extremity of the wheel support 18 is secured to the handle 16 and the other extremity is connected to the pivoting assembly 19.

As shown on FIG. 2, in this embodiment, the bin 20 is in a stationary configuration when the handle 16 stands substantially vertically proximate to the container 22. In the stationary configuration, the bin 20 is supported by the bottom wall 23 of the container 22 which lays flat on the ground. In this configuration, the set of bin wheels 24 mounted on the container 22 of the bin 20 and the auxiliary wheel 14 may abut the ground as well, however, the friction between the ground and the bottom wall 23 of the container 22 of the bin 20 is such that the bin 20 remains stationary.

Now referring to FIG. 3, when the handle 16 is pivoted downwardly and away from the container 22 of the bin 20, the bin 20 moves from the above-described stationary configuration to the transport configuration. In the transport configuration (shown on FIG. 3), the bin is supported on one side by the wheels 24 of the set of bin wheels, and on the other side by the auxiliary wheel 14. In the transport configuration, the bottom wall 23 of the container 22 is spaced-apart from the ground.

Given the length of the handle 16 and the design of the auxiliary rolling system 10, the transition from the stationary configuration to the transport configuration does not require much strength from the user. Once the transport configuration is reached, the bin 20 can be rolled around, using the handle 16 for steering.

Now referring to FIGS. 4 and 5, similar stationary configuration, transport configuration and transition between both configurations could be achieved by the mounting of an auxiliary rolling system 10 according to an embodiment shown in these figures, onto a rolling bin 20.

In an alternative embodiment not shown in the appended figures, the auxiliary rolling system is designed for the bin 20 to be supported by the set of bin wheels 24 of the container 22 and the at least one auxiliary wheel 14, in both the stationary configuration and the transport configuration. Such an embodiment could be achieved simply by maintaining the handle in the pivoted position shown on FIG. 3. In this embodiment, immobility of the bin 20, in the stationary configuration, is provided by a wheel locking system in combination with the at least one auxiliary wheel 14, such as, without being limitative, a friction brake or braking pins preventing rotational movement of the auxiliary wheel 14. When the transition is made to the transport configuration, the wheel locking system is released, therefore allowing displacement of the bin 20. Transition from the stationary configuration is not limited to pivotal movement of the handle 16 and could occur, for example, and without being limitative, by pulling on the handle 16, pressing/pulling a button or any other activation mechanism.

Regardless of the embodiment, the auxiliary rolling system 10 should be designed such that the bin 20 remains in the stationary configuration when at rest, in order to prevent undesirable movement of a bin 20 left unattended, and to provide braking capabilities when needed. In the embodiments shown on FIGS. 1 to 5, gravitational force will provide the necessary bias to abut the bottom wall 23 of the container 22 on the ground, when at rest, and ensure that the default configuration is the stationary configuration. In another possible embodiment where the bin 20 is supported by the set of wheels 24 of the container 22 and the at least one auxiliary wheel 14 in both the stationary configuration and the transport configuration, a biasing mean for automatically activating the wheel locking system, when at rest, may need to be further provided.

Referring to FIGS. 6 to 10, there is shown an alternative embodiment of the auxiliary rolling system 10 wherein the features are numbered with reference numerals in the 100 series which correspond to the reference numerals of the previous embodiment.

Figure 6A:
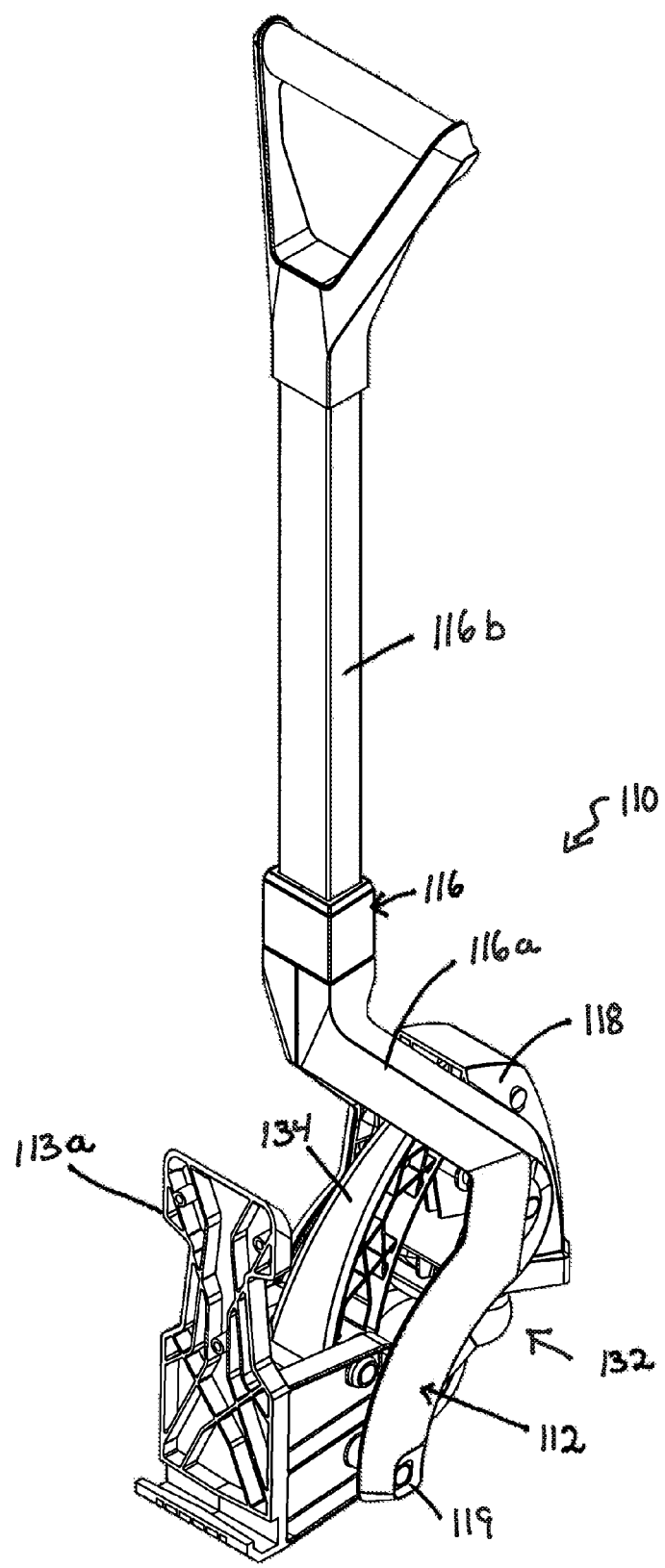
FIG. 6 includes FIGS. 6a and 6b and is a perspective view of an auxiliary rolling system in accordance with another embodiment.
Figure 6B:
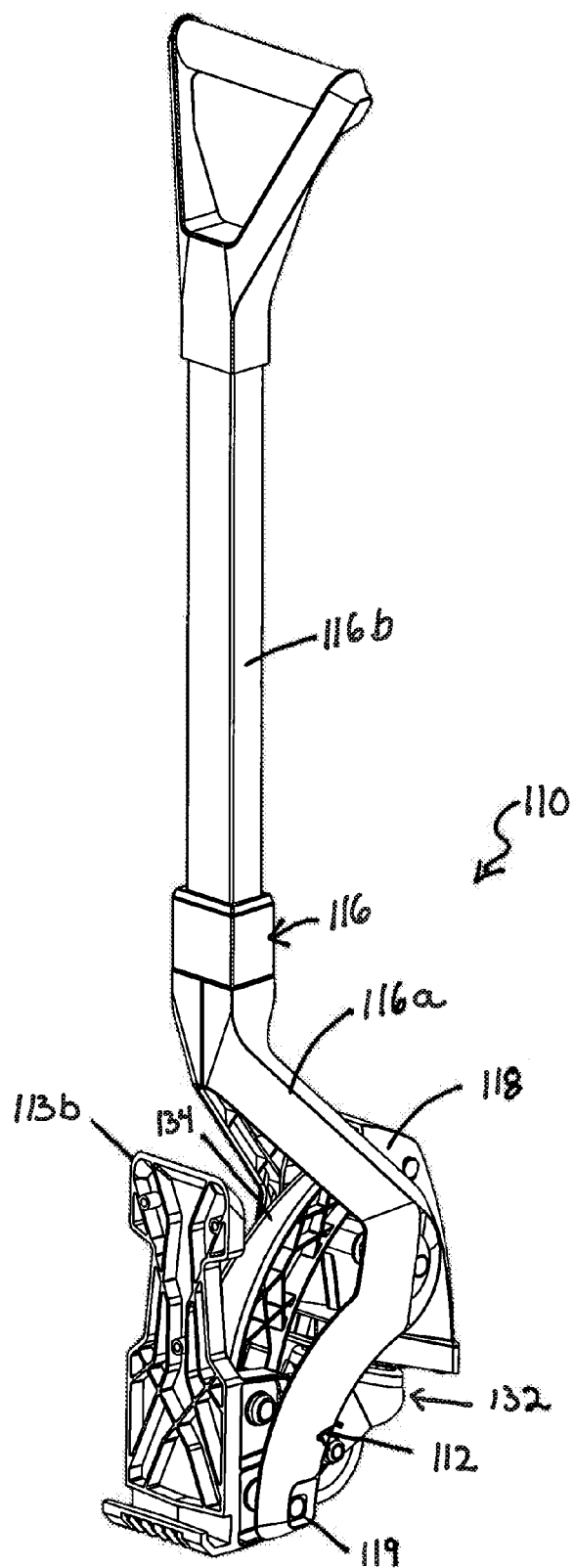
Figure 7A:
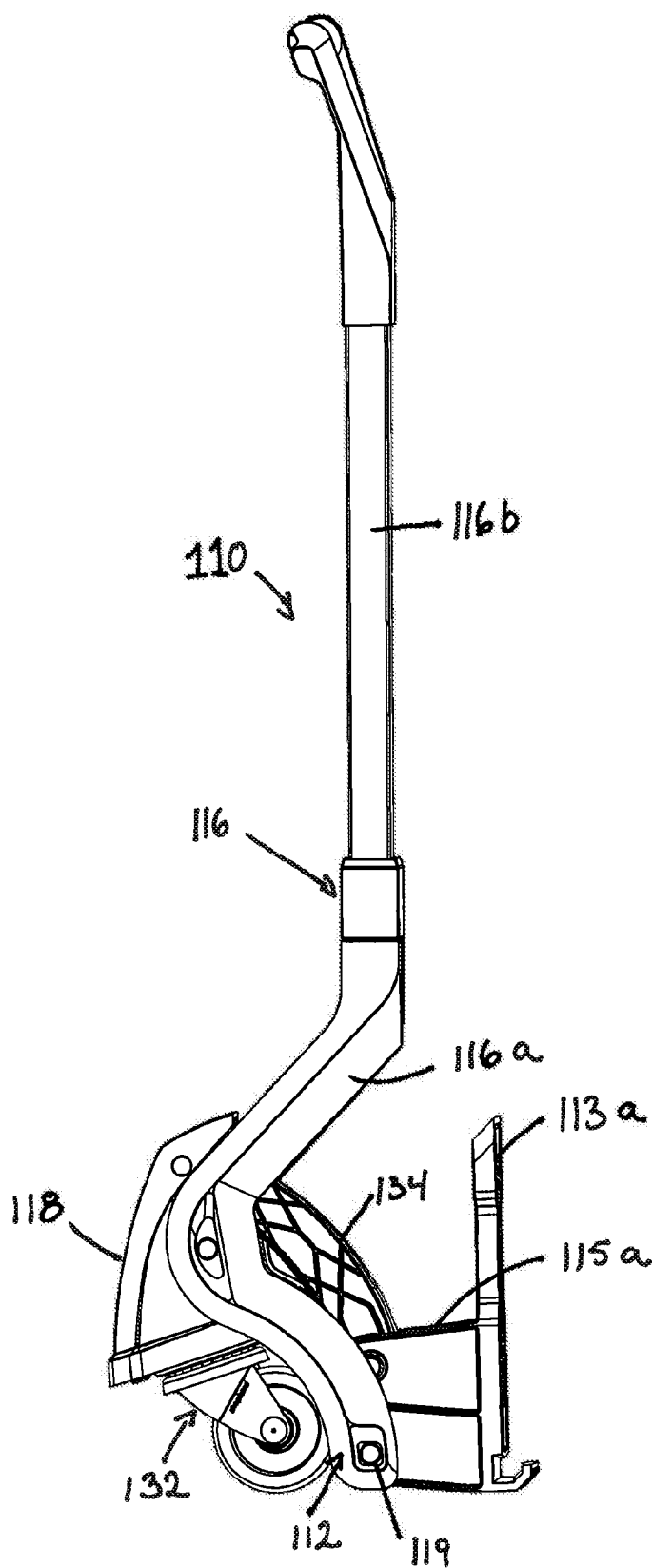
FIG. 7 includes FIGS. 7a and 7b and is a side elevation view of the auxiliary rolling system of FIG. 6.
Figure 7B:
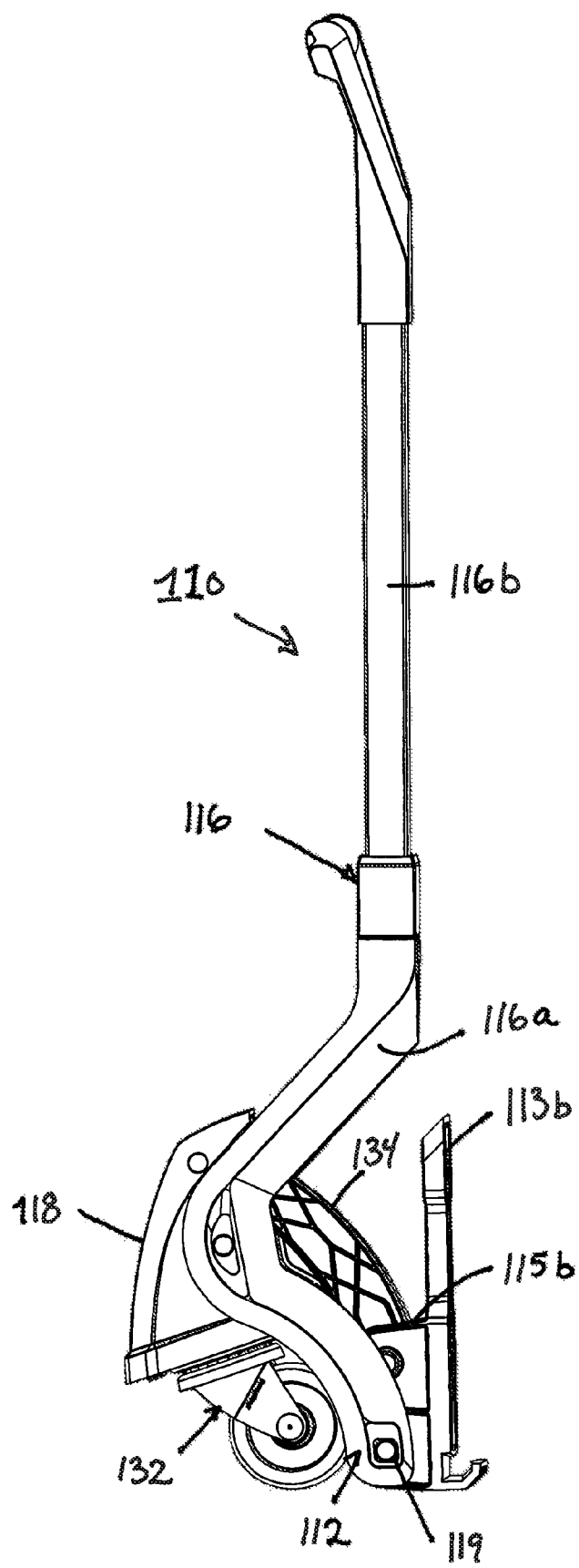
Figure 8:
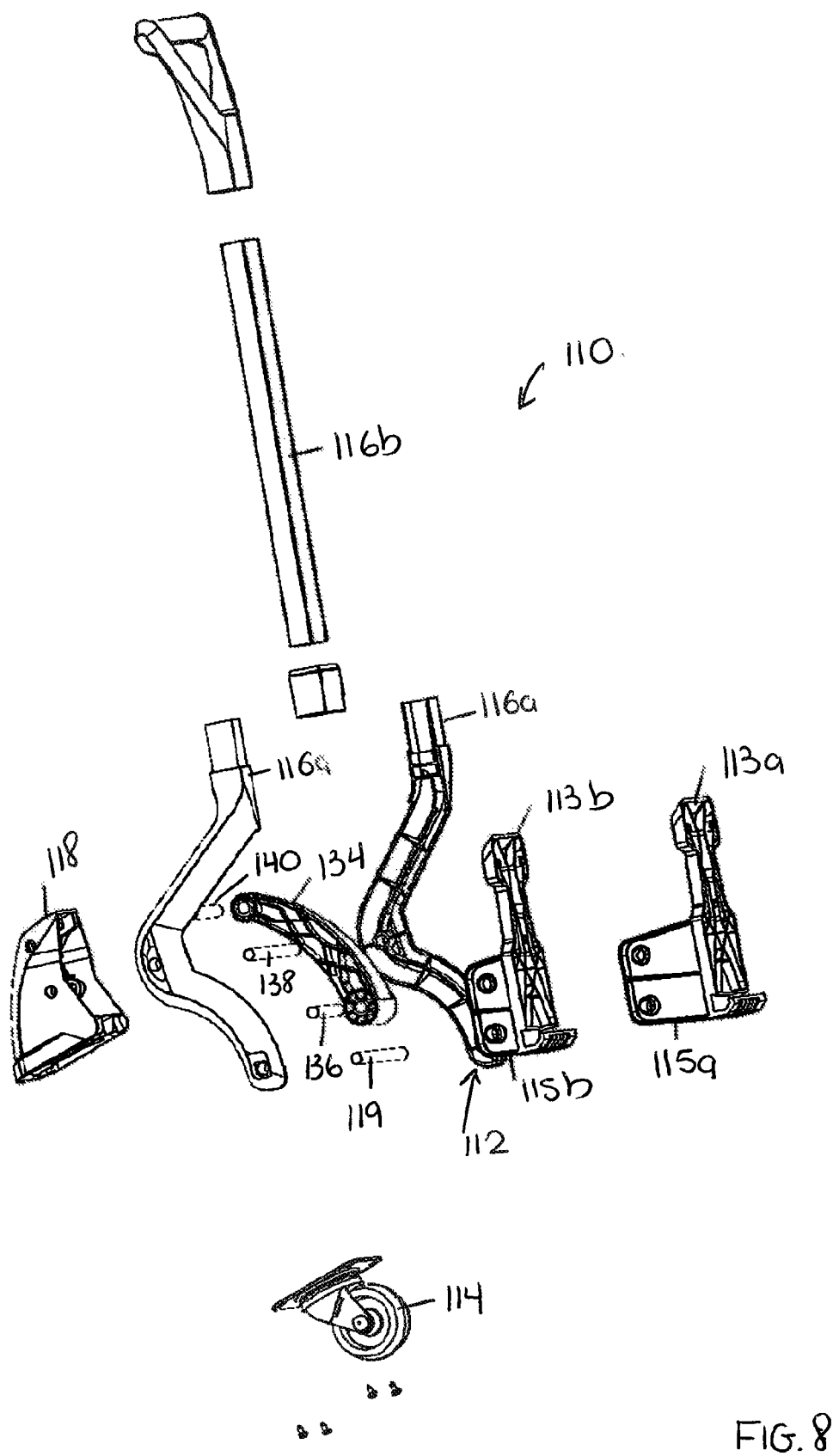
FIG. 8 is a perspective view, exploded, of the auxiliary rolling system of FIG. 6.

The auxiliary rolling system 110 comprises a frame 112 including a bin receiving member 113 with a generally flat mounting surface abuttable against the container 22 and securable thereto. In the embodiment shown, the auxiliary rolling system 110 can be provided with a plurality of interchangeable bin receiving members 113a (FIGS. 6a, 7a), 113b (FIGS. 6b, 7b). Two bin receiving members 113a, 113b are shown in FIGS. 6 to 8, each being selectively engageable with the frame 112 and characterized by an arm length. The bin receiving member 113a, 113b can be selected in accordance with the properties of the container 22 to which it is secured. For instance, if the container 22 includes a recess in which the bin receiving member 113 is engaged, a bin receiving member 113a having a longer arm 115a can be engaged with the frame 112 of the auxiliary rolling system 110. However, if the container 22 has a substantially flat outer surface, a bin receiving member 113b having a shorter arm 115b can be engaged with the frame 112 of the auxiliary rolling system 110. Consequently, in an embodiment, the bin receiving member 113 can be detachably engaged with the frame 112 of the auxiliary rolling system 110. In still an alternative embodiment (not shown), the bin receiving member 113 can be selectively engageable in a plurality of configurations with the frame 112 and the configuration can be selected based on the container 22 to which it is mounted.

As the auxiliary rolling system 10, the auxiliary rolling system 110 further comprises an auxiliary wheel 114 rotatably connected to a section of the frame 112 and a handle 116 for controlling the auxiliary rolling system 110. In the embodiment shown, the handle 116 is pivotally mounted to a section of the frame 112 and, more particularly, the bin receiving member 113, as will be described in more details below.

The handle 116 can be divided into two adjacent sections along its length. A first one 116a of the sections is pivotally mounted to the bin receiving member 113 of the frame 112 and is substantially V-shaped. It defines a recess 132 in which the auxiliary wheel 114 is positioned in the stationary (inoperative) configuration. A second one 116b of the sections extends substantially straight from an upper end of the first section 116a.

Referring to FIGS. 7 and 8, in the embodiment shown, the handle 116 is pivotally connected to the bin receiving member 113 of the frame 112 by a pivoting assembly 119. In the illustrated embodiment, the pivoting assembly 119 allows the handle 116 to pivot vertically relative to the bin receiving member 113 of the frame 112. In the illustrated embodiment, when a user pivots the handle 116, the wheel 114 also pivots, since the wheel support 118, onto which the wheel 114 is mounted, is driven by the rotation of the handle 116, given that the wheel support 118 is pivotally secured to the handle 116.

More particularly, in the embodiment shown, the frame 112 further comprises a pivoting arm 134 which engages in rotation the wheel support 118. The pivoting arm 134 is pivotally engaged to the bin receiving member 113 and the wheel support 118, through two spaced-apart pivot axes 136, 140. Pivoting the handle 116 with respect to the pivoting assembly 119 simultaneously pivots the wheel support 118 having the auxiliary wheel 114 mounted thereto.

As shown in FIG. 8, the auxiliary rolling system 110 comprises four fasteners, three of them defining pivot axes. A first pivoting assembly 119 pivotally connects together the lower section 116a of the handle 116 with the bin receiving member 113. A second one 136 pivotally connects together a lower end of the pivoting arm 134 with the bin receiving member 113, above the pivoting assembly 119. A third one 138 connects together the two sections of the lower section 116a of the handle 116. In the embodiment shown, the pivoting arm 134 extends and pivots between the two sections of the lower section 116a of the handle 116. Finally, the fourth one 140 pivotally connects together an upper end of the pivoting arm 134 with the wheel support 118.

In FIGS. 6 and 7, the auxiliary rolling system 110 is configured in the stationary configuration wherein the wheel 114 is recessed under the lower section 116a of the handle 116. In the stationary configuration, the handle 216 stands substantially vertically. Thus, when engaged with a bin 20, the bin 20 is supported by its bottom wall 23, which lays flat on the ground.

Figure 9:
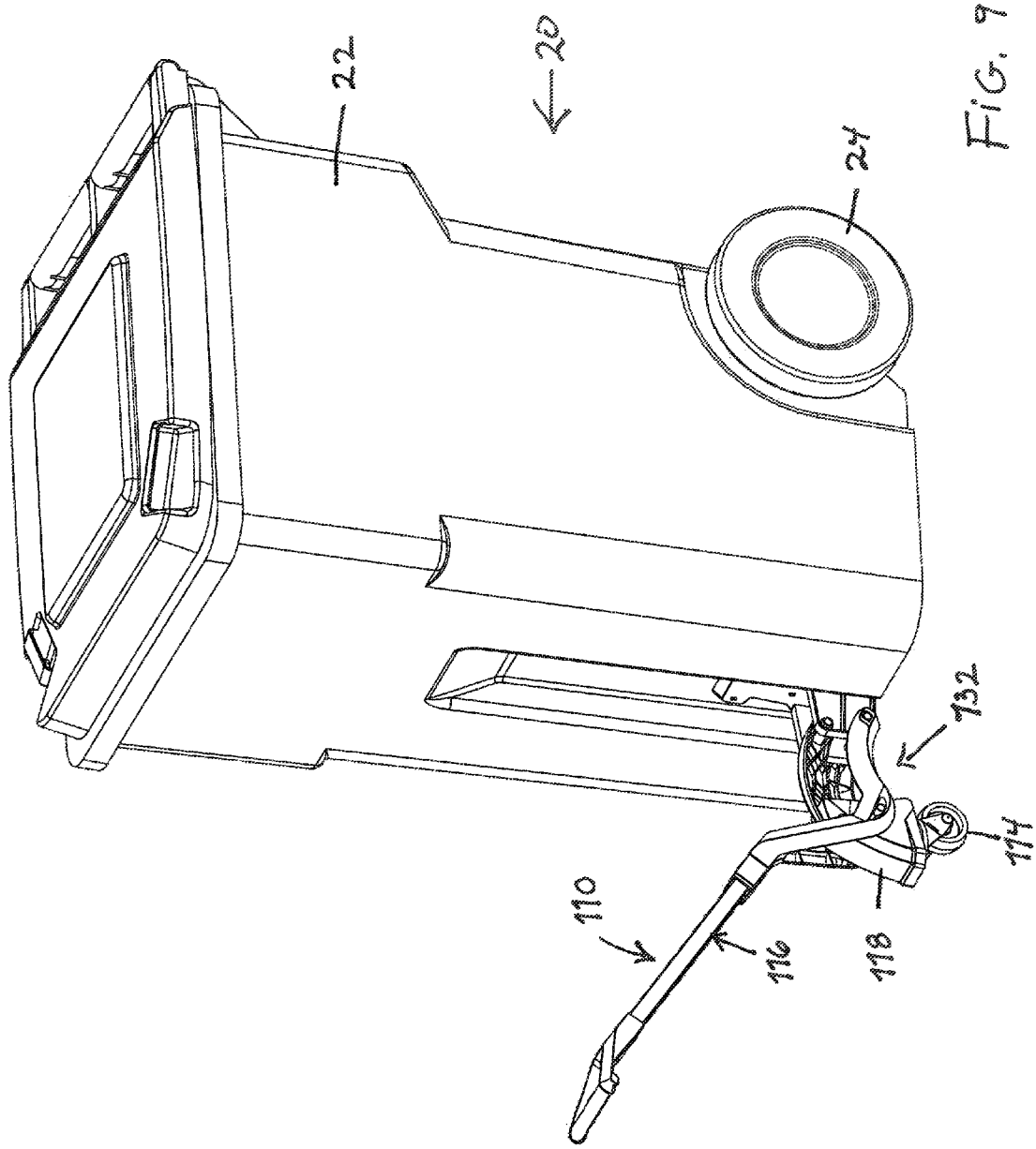
FIG. 9 is a perspective view of the auxiliary rolling system of FIG. 6, engaged with a bin and configured in the transport configuration.
Figure 10:
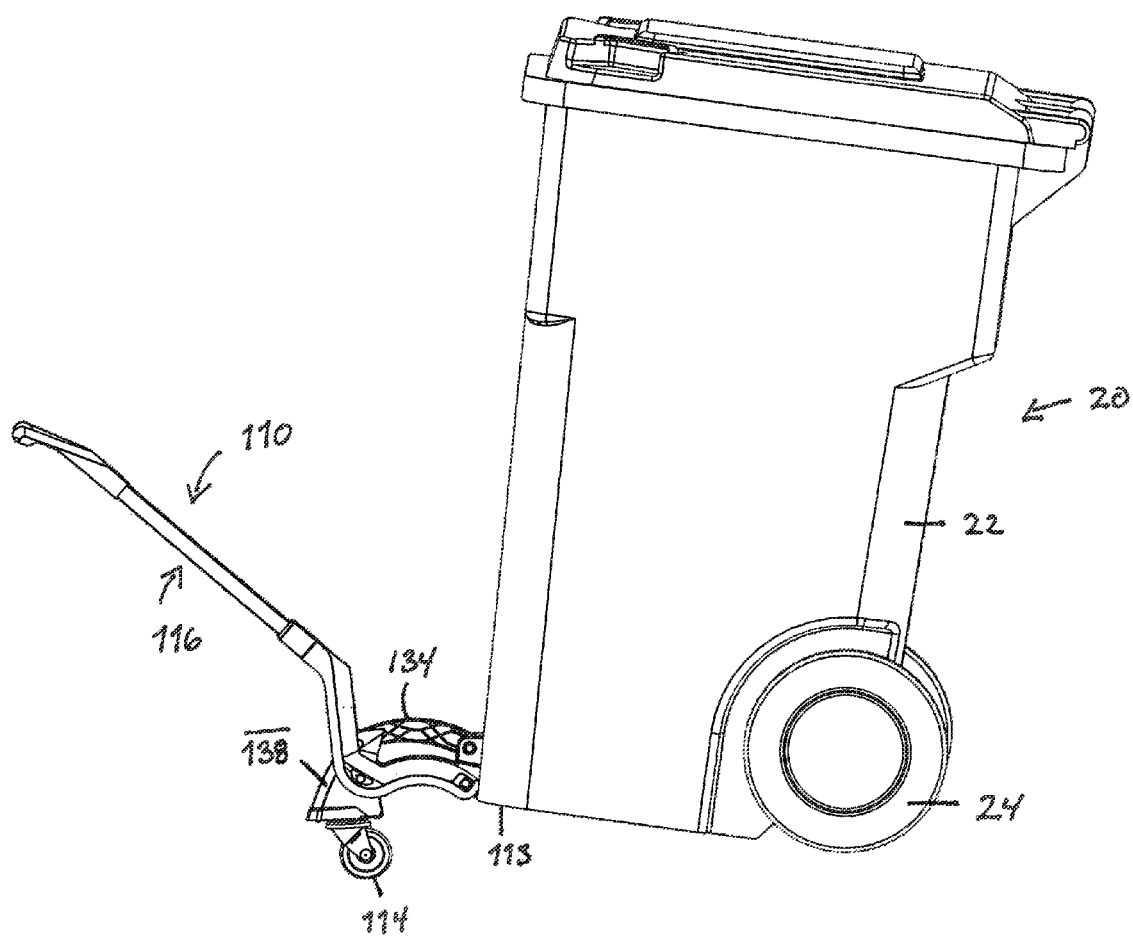
FIG. 10 is a side elevation view of the auxiliary rolling system of FIG. 6, engaged with the bin and configured in the transport configuration

In FIGS. 9 and 10, the auxiliary rolling system 110 is configured in the transport configuration, wherein the handle 116 is pivoted downwardly, away from the container 22 of the bin 20. The bin 20 is thus configured in the transport configuration where it is supported on one side by the wheels 24 of the set of bin wheels, and on the other side by the auxiliary wheel 114. In the transport configuration, the bottom wall 23 of the container 22 is spaced-apart from the ground. In the transport configuration, the auxiliary wheel 114 is pivoted away from the recess 132 defined by the first section 116a of the handle 116.

A person skilled in the art will easily understand that even though the auxiliary rolling system is presented herein as a preassembled system, the system could be provided as a kit which would allow a user to assemble an auxiliary rolling system 10 such as the one described herein.

Moreover, it will also be easily understood by one skilled in the art that even though the auxiliary rolling system 10 is presented herein as a system mountable on a rolling bin 20, the auxiliary rolling system 10 could be integral to the rolling bin 20, thereby resulting in a rolling bin 20 with an integrated auxiliary rolling system 10.

Several alternative embodiments and examples have been described and illustrated herein. The embodiments of the invention described above are intended to be exemplary only. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. It is understood that the invention may be embodied in other specific forms without departing from the spirit or central characteristics thereof. The present examples and embodiments, therefore, are to be considered in all respects as illustrative and not restrictive, and the invention is not to be limited to the details given herein. Accordingly, while the specific embodiments have been illustrated and described, numerous modifications come to mind without significantly departing from the scope of the invention.

The invention claimed is:

1. An auxiliary rolling system for a rolling bin having a container and a set of bin wheels mounted thereon, the auxiliary rolling system comprising:

a frame having a bin receiving member securable to the container of the rolling bin, a handle having a gripping end and a lower end, opposed to the gripping end, for controlling the auxiliary rolling system, and at least one auxiliary wheel, the lower end of the handle being pivotably connectable to the bin receiving member and pivotable about a pivoting axis between a stationary configuration and a transport configuration;

wherein, when mounted on the rolling bin, the pivoting axis is disposed between the rolling bin and the at least one auxiliary wheel, and the at least one auxiliary wheel is positioned opposite to the set of bin wheels such that the auxiliary rolling system is movable between the stationary configuration, where movement of the bin is prevented, and the transport configuration where the rolling bin is supported by the set of bin wheels and the at least one auxiliary wheel and movement thereof is allowed.

2. The auxiliary rolling system as claimed in claim 1, wherein the at least one auxiliary wheel is connected to the handle and is configurable between the stationary configuration and the transport configuration by pivoting the handle with respect to the bin receiving member.

3. The auxiliary rolling system as claimed in claim 2, wherein the frame further comprises a wheel support connected to the handle and pivoting therewith and the at least one auxiliary wheel is rotatably mounted to the wheel support.

4. The auxiliary rolling system as claimed in claim 2, wherein a bottom wall of the container abuts the ground in the stationary configuration of the at least one auxiliary wheel and the bottom wall of the container is spaced-apart from the ground in the transport configuration.

5. The auxiliary rolling system as claimed in claim 2, wherein the at least one auxiliary wheel is recessed below a section of the handle in the stationary configuration.

6. The auxiliary rolling system as claimed in claim 1, wherein the handle is pivoted downwardly to configure the auxiliary rolling system in the transport configuration.

7. The auxiliary rolling system as claimed in claim 1, wherein the bin receiving member is detachably engageable to a lower section of the container, adjacent to a bottom wall of the container.

8. The auxiliary rolling system as claimed in claim 1, wherein the bin receiving member is engageable in a plurality of configurations with the frame.

9. The auxiliary rolling system as claimed in claim 1, wherein the at least one auxiliary wheel comprises a swivel wheel.

10. An auxiliary rolling kit for assembling an auxiliary rolling system mountable on a rolling bin having a set of bin wheels, the auxiliary rolling kit comprising:

a frame engageable with a container of the rolling bin, a pivotally connectable handle having a gripping end and a lower end, opposed to the gripping end and pivotally connectable to the container at a pivoting axis, and at least one rotatably connectable auxiliary wheel, wherein the pivoting axis being disposed between the rolling bin and the at least one rotatably connectable auxiliary wheel, wherein the auxiliary rolling system resulting from the assembly of the auxiliary rolling kit allows shifting of the bin between a stationary configuration and a transport configuration where the rolling bin is supported by the set of bin wheels and the at least one rotatably connectable auxiliary wheel.

11. The auxiliary rolling kit as claimed in claim 10, wherein the at least one auxiliary wheel is connected to the handle and is configurable between the stationary configuration and the transport configuration by pivoting the handle.

12. The auxiliary rolling kit as claimed in claim 11, wherein the frame further comprises a wheel support connected to the handle and pivoting therewith and the at least one auxiliary wheel comprises a swivel wheel and is secured to the wheel support.

13. The auxiliary rolling kit as claimed in claim 10, wherein the frame comprises a bin receiving member securable to a lower section of the container, adjacent to a bottom wall of the container, and the handle is pivotally connected to the bin receiving member.

14. The auxiliary rolling kit as claimed in claim 13, wherein the bin receiving member is engageable in a plurality of configurations.

15. A combination including a rolling bin and an auxiliary rolling system, the rolling bin comprising:
   a container and a set of bin wheels mounted on opposite sides of the container; and
   the auxiliary rolling system comprising:
   a frame including a bin receiving member secured to the container,
   at least one auxiliary wheel, and
   a pivotable handle having a gripping end and a lower end, opposed to the gripping end, pivotally connectable to the bin receiving member at a pivoting axis that is disposed between the rolling bin and the at least one auxiliary wheel, the handle being pivotable between a stationary configuration and a transport configuration;
   the auxiliary rolling system being configurable by pivoting the handle between the stationary configuration and the transport configuration where the bin is supported by the set of bin wheels and the at least one auxiliary wheel and movable.

16. The combination as claimed in claim 15, wherein the at least one auxiliary wheel is connected to the handle and is configurable between the stationary configuration and the transport configuration by pivoting the handle with respect to the bin receiving member.

17. The combination as claimed in claim 15, wherein the frame further comprises a wheel support connected to the handle and pivoting therewith and at least one of the at least one auxiliary wheel is rotatably mounted to the wheel support.

18. The combination as claimed in claim 15, wherein a bottom wall of the container abuts the ground in the stationary configuration and the bottom wall of the container is spaced-apart from the ground in the transport configuration.

19. The combination as claimed in claim 15, wherein the at least one auxiliary wheel is recessed below a section of the handle in the stationary configuration.

20. The combination as claimed in claim 15, wherein the handle is pivoted downwardly to configure the bin in the transport configuration.

21. The combination as claimed in claim 15, wherein the bin receiving member is detachably engageable to a lower section of the container, adjacent to a bottom wall of the container.

22. The combination as claimed in claim 15, wherein the bin receiving member is engageable in a plurality of configurations.

23. The combination as claimed in claim 15, wherein the at least one auxiliary wheel comprises a swivel wheel.

* * * * *